US006169121B1

(12) United States Patent
Noguchi et al.

(10) Patent No.: US 6,169,121 B1
(45) Date of Patent: Jan. 2, 2001

(54) METHOD AND APPARATUS FOR RECYCLING STYRENE RESIN

(75) Inventors: Tsutomu Noguchi; Mayumi Miyashita; Yasuhito Inagaki; Haruo Watanabe, all of Kanagawa (JP)

(73) Assignee: Sony Corporation, Tokyo (JP)

( * ) Notice: Under 35 U.S.C. 154(b), the term of this patent shall be extended for 0 days.

(21) Appl. No.: 09/332,039

(22) Filed: Jun. 14, 1999

(30) Foreign Application Priority Data

Jun. 18, 1998 (JP) .................................................. 10-171857
Jun. 18, 1998 (JP) .................................................. 10-171858
Jul. 24, 1998 (JP) .................................................. 10-209432

(51) Int. Cl.$^7$ ............................... C08J 11/04; B01J 19/08
(52) U.S. Cl. ........................... 521/47; 528/497; 528/502; 264/40.2; 422/186
(58) Field of Search .................... 521/47, 915; 528/497, 528/502; 264/40.2; 422/186, 186.04

(56) References Cited

U.S. PATENT DOCUMENTS 5,672,631 * 9/1997 Pauls et al. .............................. 521/49

FOREIGN PATENT DOCUMENTS

4139257 * 10/1994 (DE) .
WO 94/24194 * 10 1994 (WO) .

* cited by examiner

Primary Examiner—James J. Seidleck
Assistant Examiner—Olga Asinovsky
(74) Attorney, Agent, or Firm—Sonnenschein, Nath & Rosenthal

(57) ABSTRACT

There is provided a processing method for effectively and promptly removing insoluble components contained in a solution of a styrene resin waste material to enable regeneration of high-quality regenerated styrene. To this end, a solution of the styrene resin waste material in an organic solvent is processed with, for example, a dehydrating agent, to remove insoluble components. The resulting clarified solution is degasified on heating in vacuum to remove the organic solvent for recycling the resulting mass as a regenerated styrene resin. The insoluble components include foreign matter, such as moisture, sludge and colorant agents. By this processing method, it becomes possible to recycle high-quality regenerated styrene.

14 Claims, 15 Drawing Sheets

METHOD AND APPARATUS FOR RECYCLING STYRENE RESIN

RELATED APPLICATION DATA

The present application claims priority to Japanese Application Nos. P10-171857 filed Jun. 18, 1998; P10-171858 filed Jun. 18, 1998 and P10-209432 filed Jul. 24, 1998 which applications are incorporated herein by reference to the extent permitted by law.

BACKGROUND OF THE INVENTION

1. Field of the Invention

This invention relates to a method and apparatus for producing high-quality regenerated styrene resin by recycling from a waste styrene resin material, such as expanded styrene or styrene cabinets.

2. Description of the Related Art

Styrene resins are used extensively as a cabinet material for a variety of electric appliances, while its expanded product, that is expanded styrene, is used in larger quantities as a variety of packaging materials.

In recent years, it is contemplated to recover and re-utilize the waste material of this sort from the viewpoint of environmental maintenance and economic merits. For example, there is proposed a styrene recycling system of reducing the volume of expanded styrene or styrene cabinets by dissolving them in an organic solvent, transporting the resulting solution to a recycling plant to remove and recover the organic solvent and to recycle the resulting product as regenerated styrene.

SUMMARY OF THE INVENTION

Meanwhile, in the above recycling system, there are left in the solution obtained on dissolving expanded styrene or styrene cabinets insoluble impurities less than hundreds of microns in size, including water content, dust, animal oil, such as fish oil, inorganic particles, such as carbon black or dyestuffs, or other insoluble components, these insoluble impurities frequently detracting from the quality of the regenerated styrene.

For removing impurities from the solution containing high-molecular materials, metal mesh filters, bag filters of polyolefin or polyester fibers, or filter cloths, are routinely used. Although solid impurities in the solution can be removed to some extent with these filters, sludges containing the moisture or animal oils, or inorganic pigments, such as carbon black, cannot at present be removed. If the filter mesh size is refined, the rate of removal of solid impurities, such as sludges or colorants, is improved, however, if the solution is of high viscosity, the rate of percolation is lowered, while the filter clogging is significant, thus impracticably increasing the rate of filter exchange.

On the other hand, phosphorus pentoxide, potassium hydroxide, concentrated sulfuric acid, calcium sulfate anhydride, magnesium oxide, sodium hydroxide, calcium oxide, calcium salt anhydride or copper sulfate anhydride are known as chemical dehydrating agents for organic solvents. Of these, molecular sieve, calcium sulfate anhydride and calcium chloride anhydride, are routinely used. These dehydrators, known to exhibit dehydrating effects for organic solvents, are not sufficient in their effects in dehydration or removal of sludges or colorants in a solution of styrene or the like resin in the organic solvents.

It is therefore an object of the present invention to provide a processing method for efficiently and promptly removing insoluble impurities contained in a solution of a styrene resin waste material to enable recycling of high-quality regenerated styrene.

The present invention provides a method for recycling a styrene resin including removing insoluble components in a solution resulting from dissolution of a styrene resin in an organic solvent by one of the steps of
(a) contacting the solution with a dehydrating agent;
(b) applying an electrical field to the solution; or
(c) contacting an adsorbent with the solution;
   subsequently removing the organic solvent from the solution freed of the insoluble components; and
   recycling the resulting mass as a regenerated styrene resin.

According to the present invention, the solution of the styrene resin in the organic solvent can be effectively freed of the foreign matter, such as moisture, sludge or the colorant to enable recycling of the high-quality regenerated styrene.

DESCRIPTION OF THE PREFERRED EMBODIMENTS

Figure 1:
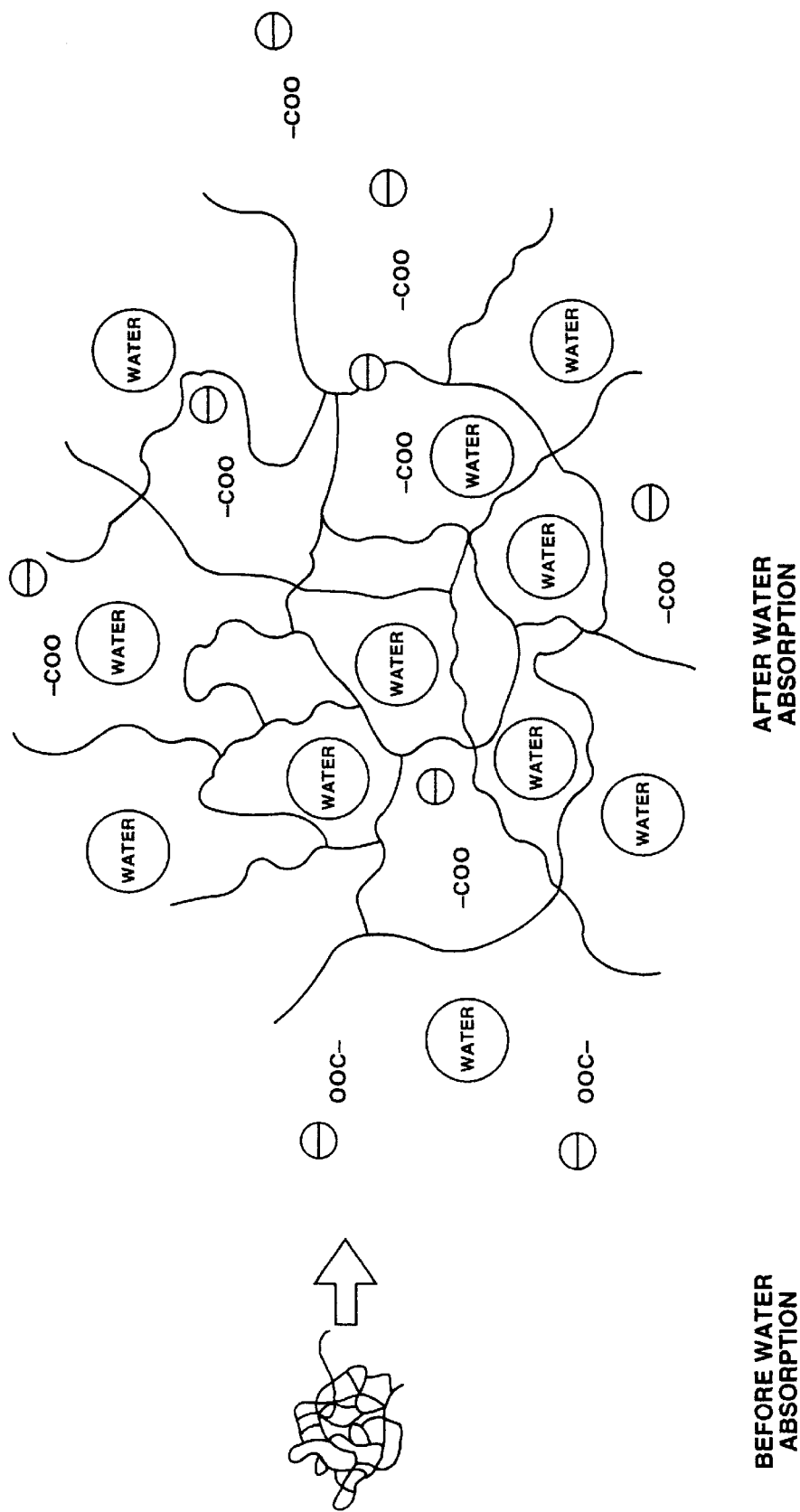
FIG. 1 is a schematic view illustrating the principle of water absorption of the water-absorbing resin.

Referring to the drawings, the recycling method embodying the present invention will be explained in detail.

The embodiment, now explained, is a styrene recycling system by dissolving a styrene (polystyrene) resin waste material, such as expanded styrene or styrene cabinet, in an organic solvent, to reduce its volume, transporting the resulting solution to a recycling plant, heating the solution in vacuum to remove and recover organic solvents and by recycling the resulting regenerated styrene, wherein insoluble components in the solution, such as water, dust, animal oils, such as fish oil, inorganic particles, such as carbon black, colorants such as pigments or dyestuffs, and other insoluble components, are removed from the solution to recycle high-quality regenerated styrene.

The material for processing is the styrene waste material at large without regard to its configuration or shape, such as an expanded styrene packaging material, expanded styrene fish box, or a variety of styrene cabinets.

This styrene resin waste material is first dissolved in an organic solvent which may be enumerated by aromatic organic solvents, ketone-based organic solvents and monoterpene-based organic solvents. Specified examples include limonene, isoamyl acetate, benzyl propionate, and esters of acetic acid. Of these, d-limonene is an organic solvent convenient for this purpose. It is noted that d-limonene is a plant oil extracted from the skin of oranges and is used as a food additive having high safety and high dissolution properties for expanded styrene such that it is most proper as the solvent used in the present invention.

The solution obtained on dissolving the styrene waste material in an organic solvent contains moisture, dust, animal oil, such as fish oil, inorganic particles, such as carbon black, colorants, such as pigments or dyestuffs or the like insoluble components.

In the first embodiment of the present invention, now explained, a removing method by a dehydrating agent is used as a method for removing the insoluble components.

According to the first embodiment of the present invention, the styrene resin waste material is first dissolved in an organic solvent, and the resulting solution is added to with a dehydrating agent insoluble in a solvent, or is passed through a layer charged with a dehydrating agent to remove insoluble components in the solution, such as moisture,. The solvent then is heated and degasified to remove and recover the solvent as well as to recycle the regenerated styrene.

Among chemical dehydrating agents for organic solvents, there are known phosphorus pentoxide, potassium hydroxide, concentrated sulfuric acid, calcium sulfate anhydride, magnesium oxide, sodium hydroxide, calcium oxide, calcium chloride anhydride and copper sulfate anhydride. Of these, molecular sieve, calcium sulfate anhydride and calcium chloride anhydride, are routinely used as dehydrating agents having high dehydrating effect and high tractability.

Although these dehydrating agents can be used, these dehydrating agents, known to exhibit a high dehydrating effect with respect to the organic solvent, have been found to be insufficient as to the effect in dehydration, sludge removal or removal of colorants in the high viscosity solution containing resins, such as styrene, dissolved therein.

The present inventors have conducted researches into a material having both the dehydrating effect and the sludge removing effect, and have confirmed that the powders containing specified water-absorbing resins and calcium oxide serve as excellent dehydrating agents for the solvent containing the styrene resin waste material dissolved in the organic solvent.

The water-absorbing resins are hereinafter explained. As an absorbent material to take the place of pulp, absorbent cotton, cloth or polyvinyl alcohol, resins exhibiting high water absorption, such as starch or polyacrylic acid, have been developed, and are currently used as a dehumidifier, an anti-dewing agent, desiccants, paper diapers or as physiological products. For example, there is currently developed a resin of high water absorption such that powders of 1 g absorb as much as 1 liter of water to form a gel. These powders are of an ionic resin of a three-dimensional structure obtained on cross-linking an inherently water-soluble resin. The principle of water absorption is illustrated in FIG. 1. In the absence of water, long resin chains are entangled, with the chains being sporadically bonded together to form a three-dimensional structure. Since the respective chains possess a large number of hydrophilic groups (—COO—), these chains are spread apart in water in an attempt to be dissolved in water. If the chains continue to be spread apart, the dissolved state is reached. However, since the high water-absorbing resin has a three-dimensional structure, water is contained to produce water-absorbing power. The water-absorbing ability can be controlled by the resin structure, such as hydrophilic groups or the cross-linking degree, such that 50 to 100 g of water can be absorbed per 1 g of the water-absorbing resin.

As the water-absorbing resins, cellulose-based resins, having the absorption factor for deionized water not less than 50, cross-linked polyacrylate-based resins or starch/acrylate graft copolymer cross-linked products, In particular, cross-linked polyacrylate-based resins or starch/acrylate graft copolymer cross-linked products having the moisture absorbing factor of not less than 400, exhibit most superior effects. These water-absorbing resins are preferably powders or fibers which are used to heat the solution to 40° or higher to remove water or sludge components.

The amount of addition of the water-absorbing resins is preferably not less than 0.01 wt % and not more than 3 wt % based on the weight of the solution.

As the dehydrating agent, a powder mixture containing calcium oxide and an inorganic oxide that is able to be hydrated with calcium oxide can be used. For example, an inorganic dehydrating flocculant containing not less than 90 wt % of mixed powders containing 5 to 30 wt % of calcium oxide, with the balance being silicon oxide, aluminum oxide and sulfonates, may be used. Specifically, water-absorbing powders containing not less than 90 wt % of mixed powders composed of four components, more specifically, water-absorbing powders containing not less than 90 wt % of mixed powders containing 20 to 40 wt % of silicon oxide, 1 to 10 wt % of aluminum oxide, 10 to 30 wt % of calcium oxide and 10 to 40 wt % of sulfonates, are added in an amount of 0.01 to 3 wt % to a solution heated to not lower than 30° C. and preferably to not lower than 60° C., the insoluble components are removed and the resulting solution is heated and degasified under vacuum to remove and recover the solvent, with the remaining product being recycled as regenerated styrene.

Figure 2:
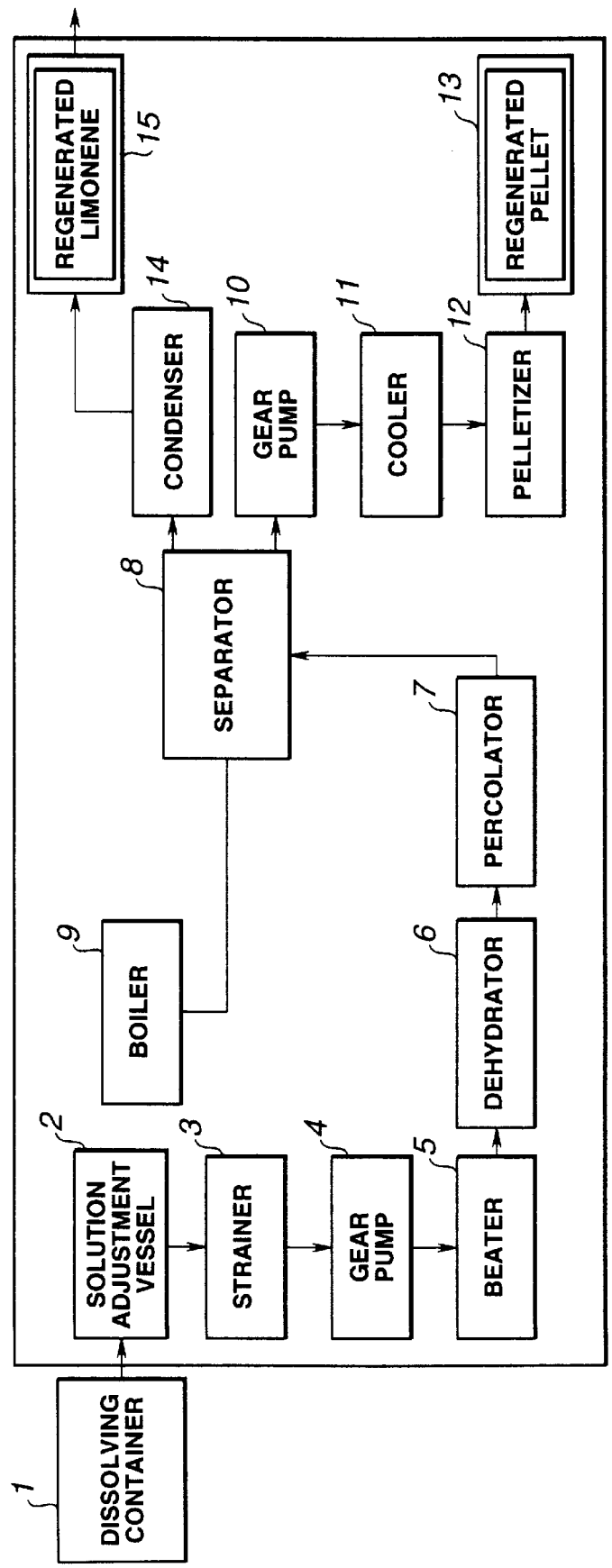
FIG. 2 is a schematic view illustrating a typical processing flow in a recycling system according to a first embodiment of the present invention.

FIG. 2 is a processing flow diagram in a styrene resin waste material recycling system according to a first embodiment of the present invention.

In this recycling system, the solution obtained on dissolving the styrene waste, material is sent from a dissolving container 1 to a solution adjustment tank 2 to provide a homogeneous composition.

This homogenized solution is passed by operation of a gear pump 4 through a strainer 3 having the function of a coarse mesh filter and is heated by a heater 5 so that the solution is lowered in viscosity.

The solution is then sent to a dehydrating unit 6 charged with the dehydrating agent and thereby freed of insoluble components, such as water or sludge.

The solution clarified by the above process is sent to a filter 7 where it is filtered and separated by a separator 8 into polystyrene and the solvent. This separator 8 is heated by the thermal medium of a boiler 9 to approximately 240° C.

The separated polystyrene is cooled by the operation of a gear pump 10 and cooled by a cooling unit 11. The cooled polystyrene os pelletized by the pelletizer 12 into pellets which are transported as regenerated pellets 13 to a molding plant so as to be re-used as a variety of polystyrene molded products or polystyrene vessels.

On the other hand, the vapor of the solvent separated by the separator 8 is liquified by a condenser 14 and recovered by a regenerating limonene tank 15 as a regenerated solvent (regenerated limonene).

Several experimental Examples according to a first embodiment of the present invention is hereinafter explained.

In the following experimental examples 1 to 5, expanded styrene fish boxes, used up in supermarkets, were used as styrene waste material. As an organic solvent for dissolving expanded styrene, d-limonene having a purity of approximately 95% (manufactured by YASUHARA CHEMICALS CO. LTD., was used.

Experimental Example 1

30 wt % of the expanded styrene waste material were dissolved in d-limonene. The resulting solution contained 1.6 wt % of moisture and 3 wt % of sludge.

This solution was heated to 60° C. and added to with 0.05 to 1 wt % of a water-absorbing resin (SUNFRESH manufactured by MITSUI KASEI CO. LTD. The resulting mixture was agitated for one hour in a stirrer.

Figure 3:
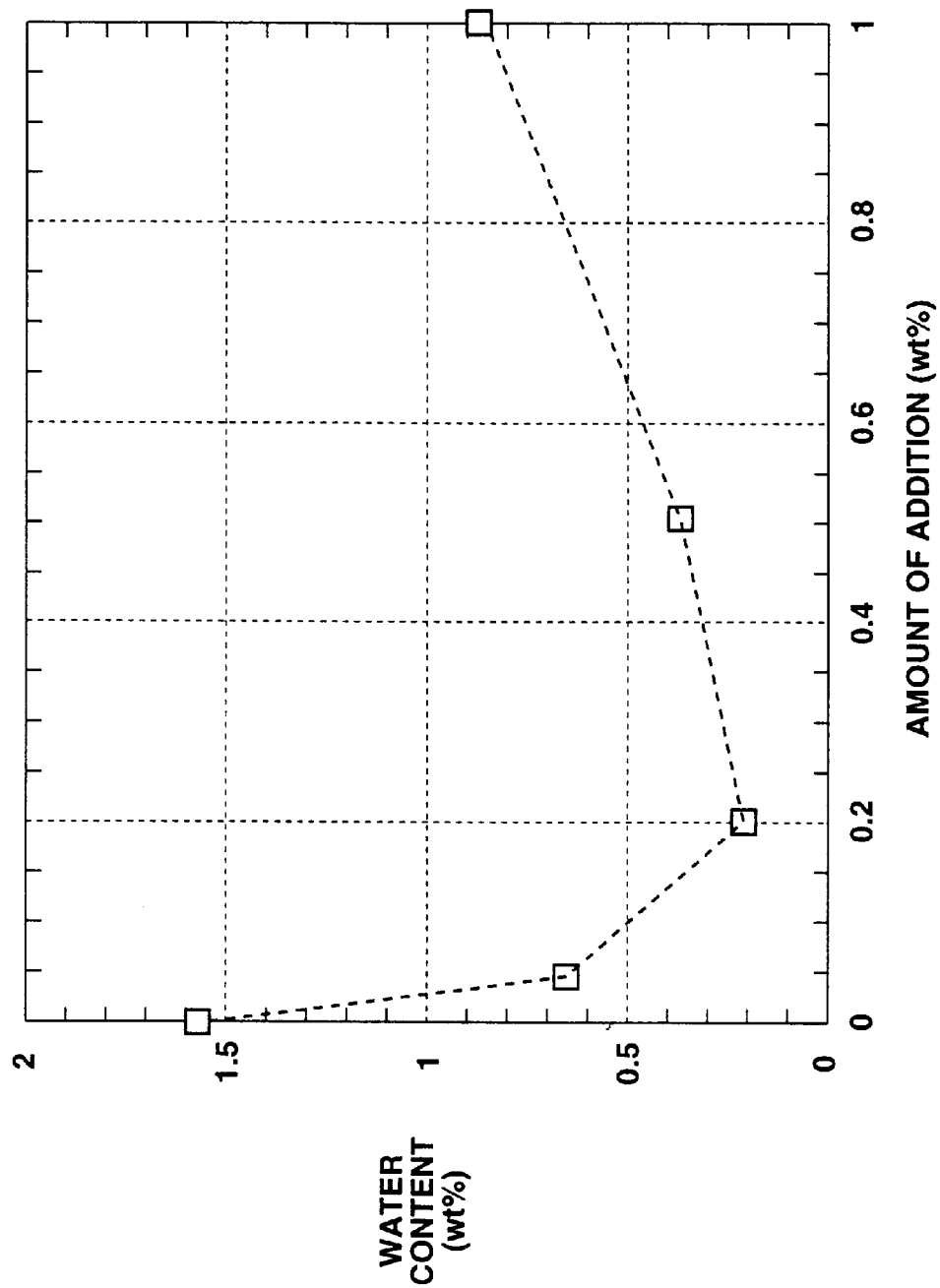
FIG. 3 is a graph showing the relation between the amount of addition of the water-absorbing resin and the amount of the moisture in the limonene solution.

The result is that the solution was clarified and a majority of the sludge was removed. FIG. 3 shows the relation between the amount of the moisture in the solution and the amount of addition of the water-absorbing resin. The moisture could be reduced to 1/5 or less by the addition of 0.02 wt % of the water-absorbing resin. The results are shown in Table 1.

The amount of the moisture was measured by nuclear magnetic resonance (NMR) method using a dimethyl sulfoxide solvent, while that of the sludge was measured from the amount of a solid substance heaped on the bottom of a centrifuging vessel after centrifuging the supernatant solution obtained by processing with the water-absorbing resin at 10000 rpm for ten minutes.

TABLE 1

| amount of addition of resin (wt %) | amount of moisture in the solution (wt %) | amount of sludge (wt %) |
|---|---|---|
| 0 | 1.8 | 3 |
| 0.05 | 0.88 | 0.5 |
| 0.2 | 0.22 | 0.3 |
| 0.5 | 0.35 | 0.2 |
| 1 | 0.86 | 0.2 |
| 3 | 1.2 | 0.2 |

As shown in Table 1, if not less than 3 wt % of the water-absorbing resin is added, the dehydrating effect is lost, even though the sludge can be removed, so that the addition of the water-absorbing resin of not less than 3 wt % is not effective. Therefore, the amount of addition of the water-absorbing resin is preferably 0.05 to 3 wt %.

Also, if the temperature of the solution is set to 20° C., the dehydrating effect is realized, however, this is not effective since the effect comparable to that of Table 1 is achieved only on agitation for approximately six hours.

A similar experiment was conducted at 60° C. for one hour on water-absorbing resin powders having the coefficient of water absorption of approximately 400 (ST-600 manufactured by SANYO-KAGAKU CO. LTD., and on cellulose fibers having the coefficient of water absorption of approximately 50. Although these resin powders were found to exhibit dehydrating and sludge removing effects, these were one-half to one-third of the effect of the water-absorbing resin having the coefficient of water absorption of approximately 1000 (ST-100). Therefore, it is desirable to use the high absorbent resin having the coefficient of water absorption as high as possible, preferably the coefficient of water absorption not less than 400.

The coefficient of water absorption was found as follows:
0.2 g of a water-absorbing resin was charged into a tea-bag type pouch (40 mm×150 mm) of a non-woven fabric, which was immersed in deionized water (with an electrical resistance of not less than 1017 Ω.

After 30 minutes, the pouch was hoisted and, after draining off water for a pre-set time, the weight of the pouch was measured and the coefficient of water absorption was calculate by the following equation (1):

$$coefficientofwaterabsoption)g/g = \frac{(weightofteabagafterabsorption) - (weightofblankteabagafterabsorption)}{(weightofhygroscopicre\ sin)} \quad (1)$$

50% each of the water-absorbing resin (trade name: ST-100) and the cellulose-based water-absorbing fibers were blended and charged into a cylindrical column 15 cm in diameter and 50 cm in length. The solution heated to 60° C. at a flow rate per minute was caused to flow through the column for a convection time of 8 minutes and recycled ten times. The water content in the solution and the sludge removing effect were equivalent to those when the water-absorbing resin was added in an amount of 0.2 wt %.

Experimental Example 2

As the organic solvents for dissolving styrene, aromatic solvents, such as toluene, ketone-based solvents, such as methylethylketone, etheric solvents, such as tetrahydrofuran, or terpene-based solvents, such as pinene or dipentene, or blends thereof, can be used. Similar experiments were conducted in which 0.5 wt % of the water-absorbing resin (trade name: ST-500) were added to solutions of toluene, methylethylketone, tetrahydrofuran and pinene. The dehydrating and sludge removing effect similar to those of the Experimental Example 1 were confirmed.

Experimental Example 3

A solution of expanded styrene processed by the method of the experimental example I (concentration: 30%) was degasified in a recycling plant having a vacuum heating degasifying unit (trade name: HI-VISCOUS EVAPORATOR manufactured by MITSUI ZOSEN CO. LTD.) (maintained at 245°; degree of vacuum, 30 Torr) to prepare regenerated styrene pellets.

The result is that the amount of black-colored impurities in the regenerated styrene pellets in the regenerated styrene pellets was drastically reduced in comparison with that in the non-processed styrene resin, such that light transmittance of the solution having the regenerated pellets dissolved therein (10%-limonene solution; measurement cell thickness, 1 cm; wavelength, 500 nm) was improved from 70% to 85%. It was also confirmed that the heat resistance of the pellets based on the glass transition temperature Tg was improved from 100° C. to 105° C., thus indicating that the high-quality regenerated styrene could be recycled by sludge removal.

Experimental Example 4

As in the experimental example 1, 30 wt % of the expanded styrene waste material was dissolved in d-limonene. In the solution were contained 1.6 wt % of water and 3 wt % of the sludge.

This solution was heated to 60° and added to with 0.2 to 5 wt % of inorganic dehydrating flocculant powders (trade name: COLGERITE manufactured by MITSUI RIKA CO. LTD., containing 8.5 wt % of calcium oxide and an inorganic oxide capable of hydrating reaction with calcium oxide having the composition of 57 wt % of silicon oxide, 10 wt % of aluminum oxide and 15 wt % of potassium sulfate). The resulting mass was stirred for one hour and allowed to stand stationarily for three hours.

Figure 4:
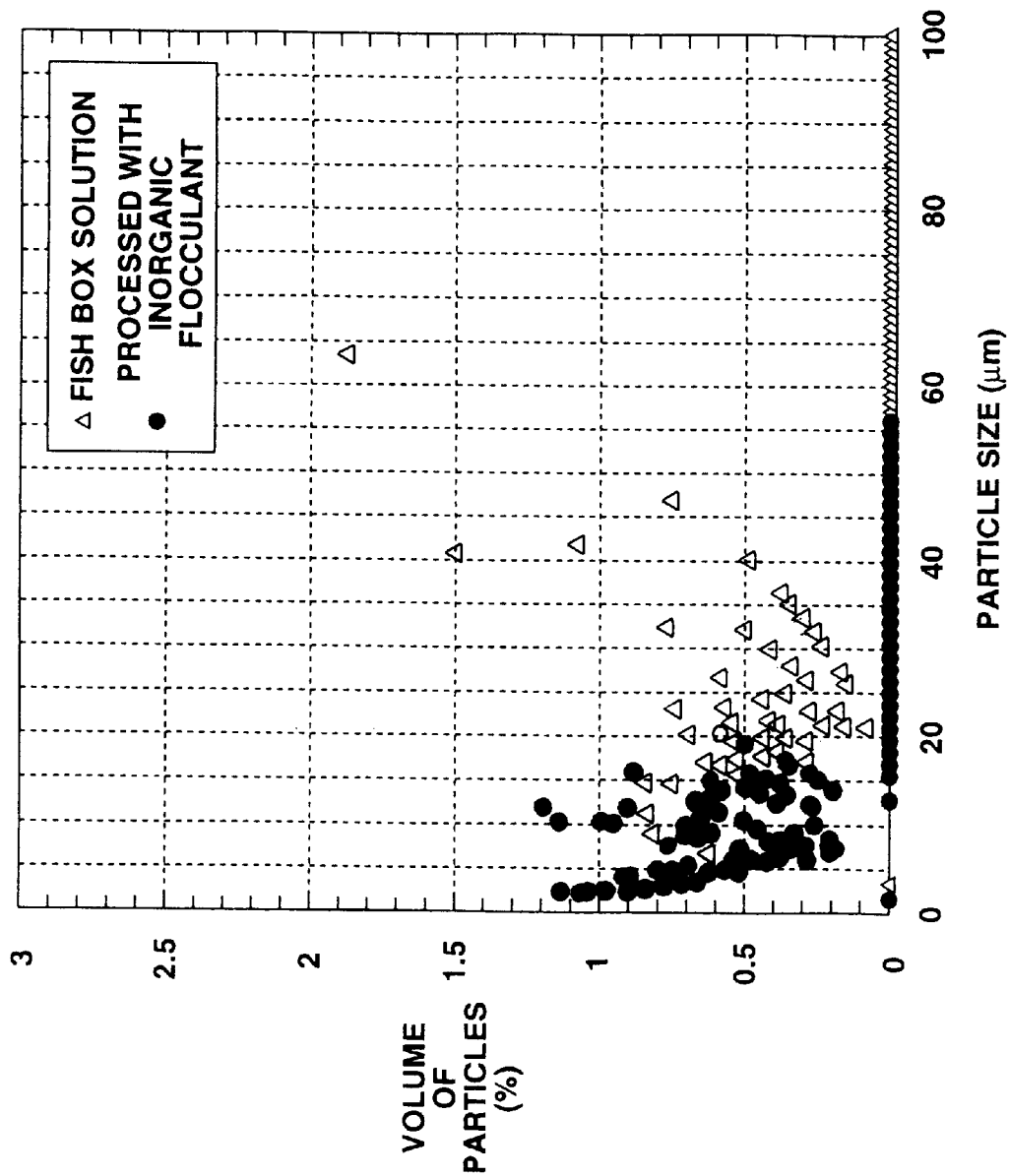
FIG. 4 is a graph showing the difference in the residual sludge caused by the presence or absence of processing by the inorganic dehydrating flocculant.

The sludge dispersed in the solution was precipitated along with the inorganic dehydrating flocculant, while the supernatant liquid was clarified, thus indicating the sludge removing effect. The particle size distribution of the impurities dispersed in the supernatant liquid was measured. The measurement was conducted using a coal tar counter multisizer and a methylethylketone-electrolyte system solvent for measurement. The results are shown in FIG. 4.

Figure 5:
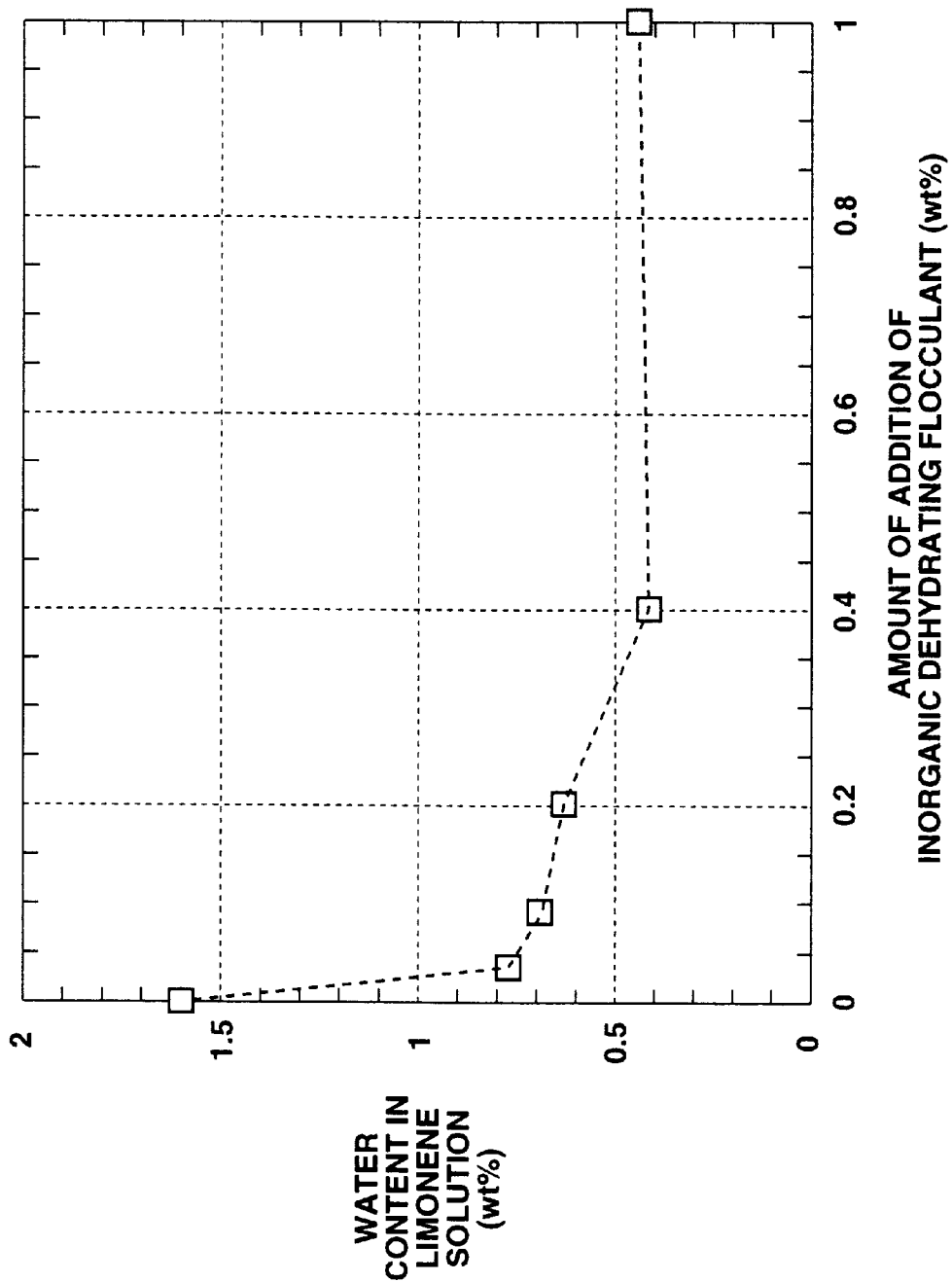
FIG. 5 is a graph showing the relation between the amount of addition of the inorganic dehydrating flocculant and the amount of the moisture in the limonene solution.

The particles with the particle size up to a maximum size of approximately 60 $\mu$m (sludge) were contained in a non-processed dissolved fish box (fish box solution). It was confirmed that the sludge not less than 20 $\mu$m in diameter could be removed by processing with the inorganic dehydrating flocculant. It was also confined that the volume of the dispersed particles could be reduced to approximately 1/10 from $7.1\times10^6$ $\mu m^3$ for a non-processed resin to $7.5\times10^5$ $\mu m^3$ for a processed resin. The measured results of the moisture content of the supernatant liquid are shown in FIG. 5. Addition of 1 wt % of the water-absorbing resin reduced the water content to not larger than one-third. It was thus confirmed that addition of the inorganic dehydrating flocculant to the limonene solution could reduce the moisture and the sludge effectively.

Experimental Example 5

An inorganic dehydrating flocculant having a composition containing 30 wt % of calcium oxide, with the balance being a mixture of powders of silicon oxide, aluminum oxide and potassium sulfate, was added to the solution for evaluation.

By increasing the amount of calcium oxide to 30 wt %, the dehydrating effect was improved by 10% as compared with Experimental Example 4. However, no changed in the sludge removing effect were observed. If the amount of calcium oxide is increased to not less than 30 wt %, basicity was improved, while dehydrating and sludge removing effect was not improved. Therefore, the content of calcium oxide of 5 to 30 wt % is desirable.

The proportions of components other than calcium oxide are substantially determined by sludge precipitation characteristics, such that preferred amounts of silicon oxide and aluminum oxide are 25 to 60 wt % and 5 to 20 wt %, respectively, with the balance being calcium or potassium sulfate, with the amounts of the four components being preferably not less than 90 wt %. This proportion range, corresponding to a cement composition range, is desirable from the viewpoint of material costs.

The solution temperature at the time of processing with the inorganic dehydrating flocculant, elevated by heating, is more effective for a shorter time. At 20° C., the processing time is approximately 6 hours, whereas, at 40° C., the processing time of approximately two hours is required. Therefore, the processing temperature of 40° C. or higher is efficient.

Experimental Example 6

High-impact polystyrene, colored in carbon black, used for a cabinet, such as a TV cabinet, was dissolved in an amount of 20 wt % in d-limonene, to which an inorganic dehydrating flocculant was added under hating at 60° C. The carbon black, as colorant dispersed in a supernatant of the solution, was flocculated and precipitated in about one hour by processing with the inorganic dehydrating flocculant (trade name: COLGERITE) used in the Experimental Example 4. The light transmittance of the solution (1 cm cell, wavelength: 500 nm) was improved from 10% to 80% such that the solution was substantially transparent. Therefore, it was confirmed that the inorganic dehydrating flocculant was effective in clarifying the polystyrene solution containing the colorants.

Comparative Example 1

The same expanded styrene waste material as that used in the Experimental Example was dissolved in an amount of 30 wt % in d-limonene. In the solution, there were contained 1.6 wt % of water and 3 wt % of sludge. This solution was heated to 60° C. and calcium sulfate anhydride was added to the 0.1 to 1 wt % solution. The processing similar to that of the Experimental Example 4 was carried out to measure the water content of the supernatant. The results are shown in FIG. 6.

Figure 6:
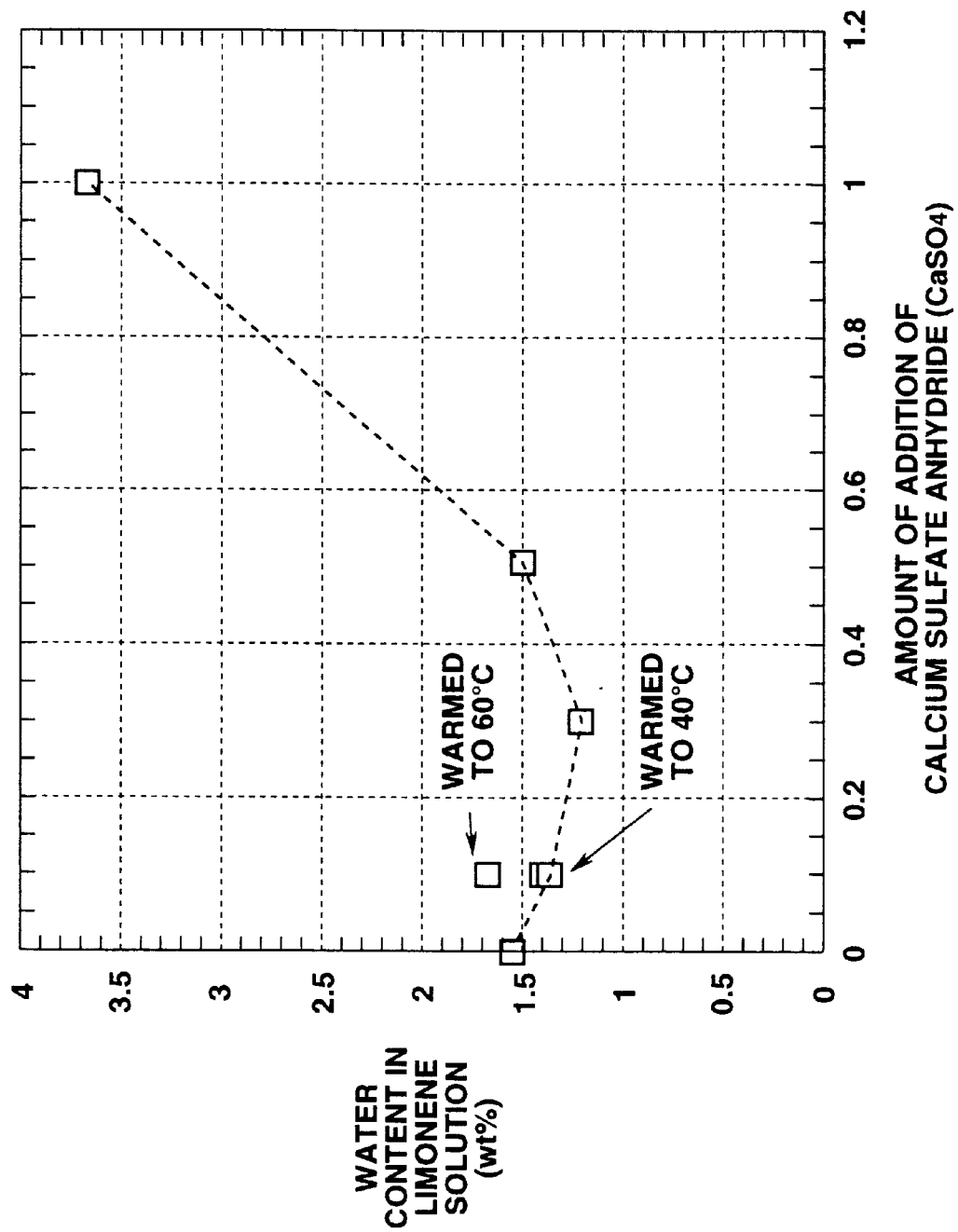
FIG. 6 is a graph showing the relation between the amount of addition of calcium sulfate anhydride and the amount of the moisture in the limonene solution.

If calcium sulfate anhydride is used, dehydrating effects or sludge removing effects are scarcely observed even on heating, as shown in FIG. 6. Although calcium chloride anhydride and molecular sieve (5A, 13A, manufactured by WAKO PURE CHEMICALS CO. LTD., were similarly checked, none of these exhibited the dehydrating effects or sludge removing effects. Although calcium oxide itself was also checked, it exhibited strong basicity such that the solution turned brownish in color. Moreover, neither the dehydrating effect nor the sludge removing effect was observed.

Referring to the drawings, the recycling method according to the second embodiment of the present invention is explained in detail. In the second embodiment, the same reference numerals are used to depict the same parts or components without making corresponding description.

In the second embodiment, the method of removal of impurities by the dc electrical field effect (electro-static separation) is used for removing insoluble impurities.

The principle of electrostatic separation is as follows: The particles of the insoluble impurities dispersed in the solution of the organic solvent are classified into positive charged particles, negative charged particles and neutral particle. If a high dc voltage (of the order of several kV/cm) is applied across a pair of electrodes, the charged particles are attracted by electrophoresis to an electrode of opposite polarity. If a pleats-like collector is inserted between the paired electrodes, there is produced a strong electrical field at the distal end of the collector. This attracts the neutral charged particles by dielectric migration. This phenomenon is exploited to remove particles of insoluble impurities in the solution of the organic solvent.

The electric charge separation can be effected using a dust collector of a bent electrically insulating sheet arranged between aluminum electrodes layered in a cylindrica configuration, by applying a dc voltage across the aluminum electrodes, with the solution of the styrene resin waste material dissolved in an organic solvent being passed through the dust collector.

At this time, the solution temperature is preferably heated to 20° C. or higher. The initial voltage to be applied across the aluminum electrodes is preferably 1 kV/cm or higher.

However, if water is contained in an excessive amount in the solution, the current flows in the solution on current application, such that sparking occurs without it being able to apply a voltage as high as several kV/cm or higher. Therefore, if desired to remove impurities of a micron size by electrostatic separation, it is necessary to remove the water in the solution as much as possible before proceeding to processing by an electrostatic separation device.

In such case, it is preferred to process the solution with a water-absorbing material in advance to lower the water content in the solution to 1 wt % or less.

For example, the styrene resin waste material is dissolved in an organic solvent and, as explained in the first embodiment, a water-absorbing material is previously added to the solution or the solution is passed through a layer charged with the water-absorbing material to reduce the moisture in the solution to 1 wt % or less. An electrical field then is applied to the solution to attract the insoluble substances in the solution towards the electrodes by electrostatic effects to separate and remove the impurities. The solution then is heated in vacuum and degasified, while the regenerated styrene is recycled.

In the second embodiment, the methods shown in the first embodiment can be applied.

Figure 7:
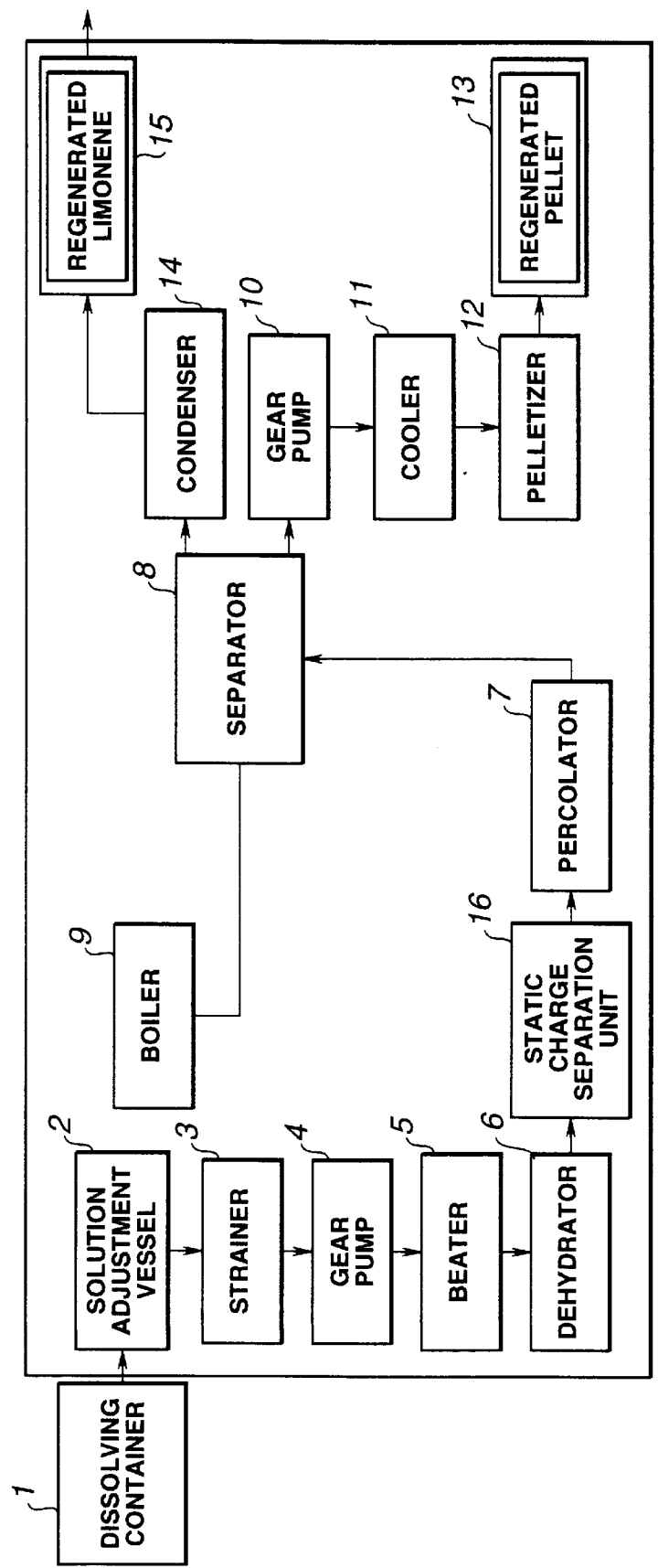
FIG. 7 is a schematic view illustrating a typical processing flow in a recycling system according to a second embodiment of the present invention.

FIG. 7 is a processing flow diagram in the styrene resin recycling system in the second embodiment.

The recycling system of the second embodiment includes an electrostatic separation unit 16 between the dehydrating unit 6 and a percolator 7 of the first embodiment shown in the processing flow diagram of FIG. 2.

Figure 8:
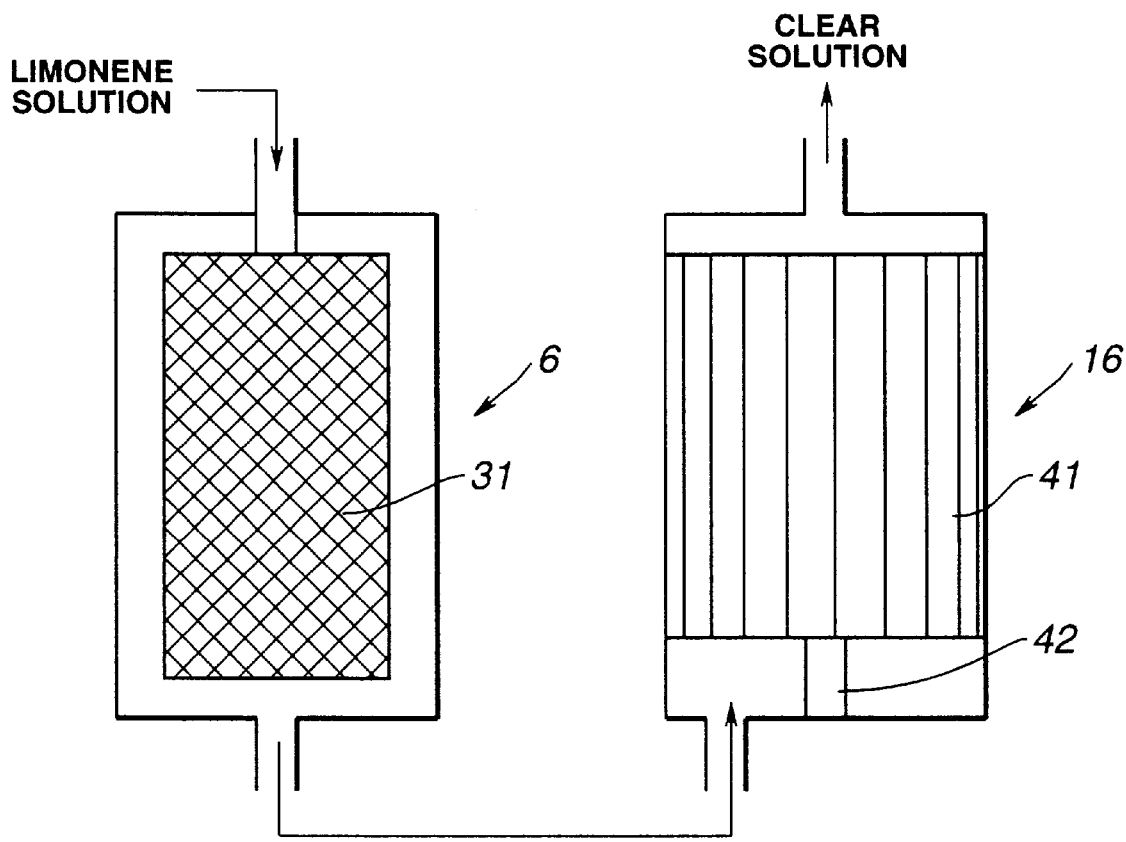
FIG. 8 is a schematic view showing an illustrative structure of a dehydrating unit and a static charge separating unit.
Figure 9:
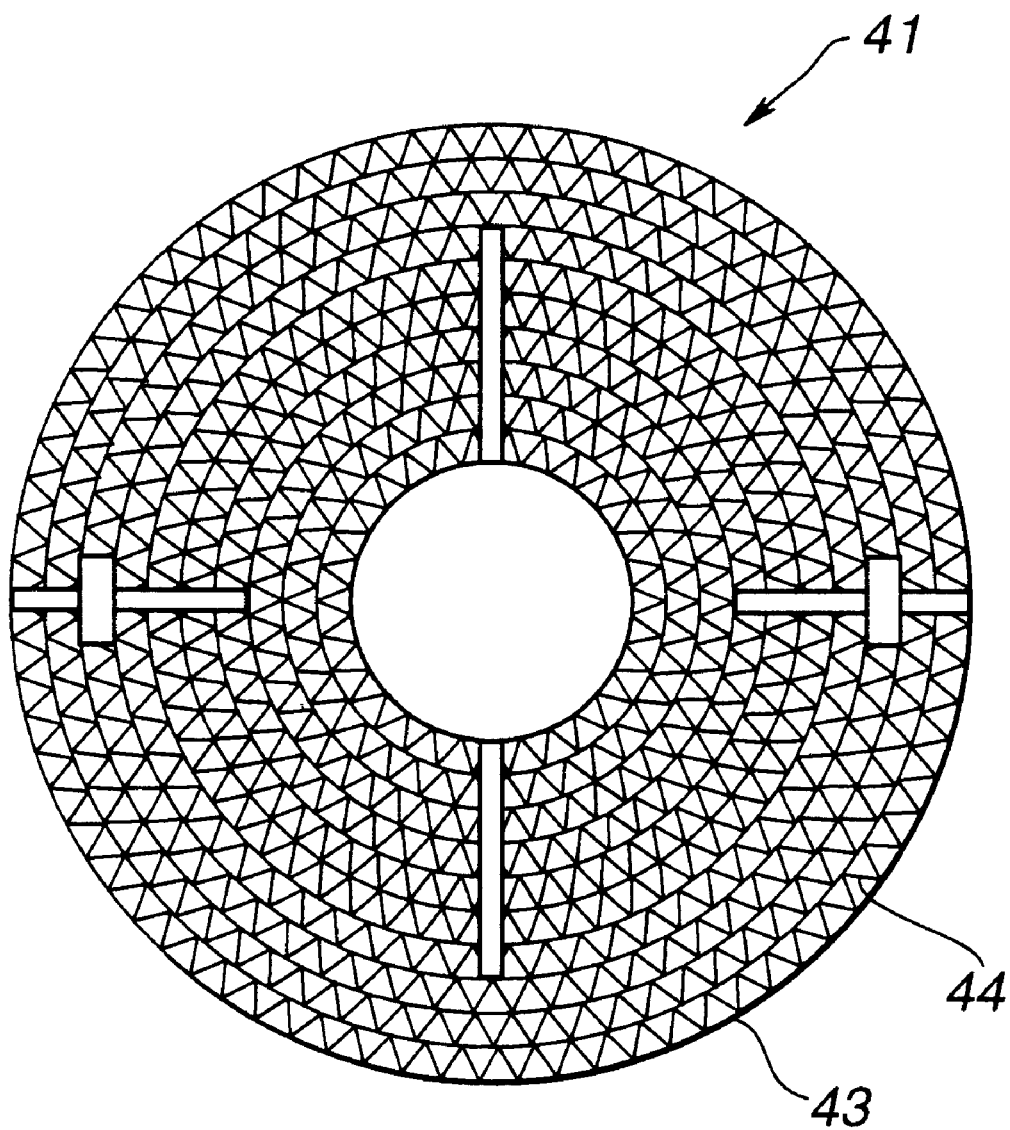
FIG. 9 is a schematic cross-sectional view showing a typical dust collector.

The dehydrating unit 6 and the electrostatic separation unit 16 are basically as shown in FIG. 8. Specifically, the dehydrating unit 6 includes a metal mesh vessel 31 charged with a water-absorbing material through which is passed the styrene resin solution to remove the moisture. The electrostatic separation unit 16 has a cylindrically-shaped dust collector 41, formed by an aluminum electrode and a paper collector, with the dust collector 41 being supported by an insulator 42 formed of Teflon. The solution is processed with an electrical field by applying the dc voltage to the aluminum electrode. Referring to FIG. 9, showing the cross-section of the dust collector 41, with the collector 44 of paper being bent in a bellows fashion and interposed in this state between cylindrically arranged plural aluminum electrodes 43.

Figure 10:
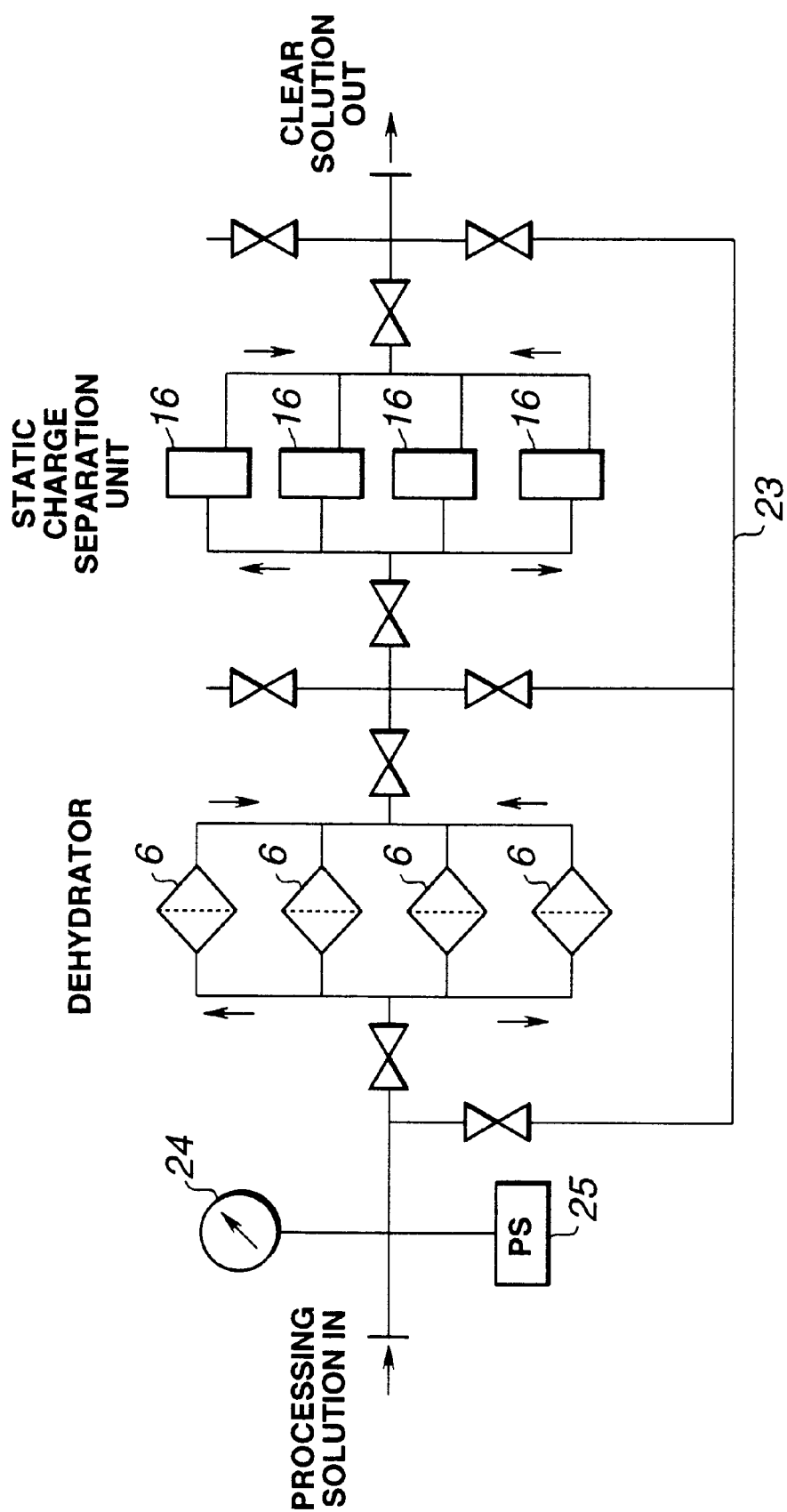
FIG. 10 is a schematic view showing a typical impurity removing unit made up of a dehydrating unit and a static charge separating unit.

FIG. 10 shows a more detailed structure of a device for removing impurities which is made up of the dehydrating agent and the electrostatic separation unit 16. Four each of the dehydrating units 6 and the electrostatic separation unit 16 are provided in parallel to permit efficient processing. In order to permit selective omission of one of dehydration or electrostatic separation, there is provided a bypass 23, while there are provided a manometer 24 and a pressure switch 25 at an inlet to the dehydrating agent 3.

The clarified solution is separated into polystyrene and an organic solvent by the same method as that of the first embodiment and reproduced.

A specified experimental example, exploiting the second embodiment of the present invention, is explained.

Experimental Example 7

An expanded styrene packaging waste material for a TV receiver, recovered from a retail shop for household electrical appliances, was dissolved in d-limonene to prepare a solution with a concentration of 20 wt %. Since the moisture content in the solution is not larger than 0.1 wt %, with there being no foreign matter, such as fine dust, processing was directly carried out by the electrostatic separation unit. The solution was passed through an electrostatic separation unit vessel at a room temperature (20° C.) at a flow rate of 3 liters per minute and circulated therethrough for four hours. The electrostatic separation vessel (EDC-03SP manufactured by CLEANTEC CO. LTD.) was of the dust collector diameter and length of 25 cm and 40 cm, respectively, with the distance between the aluminum electrodes being 3 cm, with the electrical field strength being 3.3 kV/cm, with the collector being formed of paper. The dust collector structure is as shown in FIG. 9.

By the above processing, the foreign matter with a size not less than 1 μm could be reduced in size from 5 mg/10 ml to 0.1 mg/10 ml, such that the foreign matter in styrene pellets could be reduced significantly.

On the other hand, the light transmittance of the regenerated pellet was improved from 75% to 90%. Thus, electrostatic separation led to markedly improved quality of the regenerated styrene. By heating the solution to 60° C., equivalent clarifying effects could be obtained by simply circulating the solution for 30 minutes. Thus, heating accelerates the effect of removing impurities. The possible heating temperature depends on the of the insulating material to which the high voltage can be applied, such that, in case of a vinyl chloride resin, it is necessary to set the possible heating temperature to 120° C. or less for the sake of continuous operation.

Experimental Example 8

The same fish box waste material as that used in the Experimental Example 1 was dissolved in d-limonene to prepare a solution with a concentration of 30 wt %. In the solution, there were contained 1.6 wt % of moisture and 3 wt % of sludge. If this solution is directly subjected to electrostatic separation, the current exceeds 10 mA immediately after flowing the solution, such that high voltage cannot be applied. It is therefore necessary to remove the water or foreign matter to some extent before proceeding to electrostatic separation.

The solution was heated to 60° C. and 0.05 to 1 wt % of the water-absorbing resin (manufactured by SANYO-KASEI CO. LTD. under the trade name of SUNFRESH ST-100). The solution was stirred for one hour. Thus, the solution became transparent, with the sludge content being reduced from 3 wt % to 2 wt %. The moisture content in the solution could be reduced to 0.2 wt %. If the solution is sent to the electrostatic separation unit as the moisture content in the solution is set to not larger than 1 wt %, an initial voltage of 3.3 kV/cm can be applied to the solution to enable the impurities to be removed. However, for reducing the exchange frequency of the dust collector, the moisture content in the solution is preferably set to 0.5% or less at the outset.

Experimental Example 9

In the present experimental example, it was checked whether or not fine i Impurities could be removed by the electrostatic separation. The electrostatic separation unit used was of the same type as that used in Experimental Example 7. The solution previously processed in the experimental example 8 was passed through the electrostatic separation unit at room temperature for about two hours through an electrostatic separation unit (electrical field strength, 3.3 kV/cm). It was found that the foreign matter that cannot be removed by an ordinary metal mesh filter, such as pigment components not less than the micron size, could be reduced to less than 0.1 mg/ml (amount of impurities<0.1 wt %).

Experimental Example 10

The fish box solution (30% concentration) clarified by the Experimental Example 9 was degasified in a recycling experimental plant, having a vacuum hating degasifying unit (manufactured by MITSUI ZOSEN CO. LTD. under a trade name of HIVISCOUS EVAPORATOR at a heating temperature of 245° C. and in a vacuum of 30 Torr, to prepare a regenerated styrene pellet. In this manner, the amount of foreign matter of the blackish color contained in the regenerated styrene pellets could be rendered smaller than with the non-processed solution (0.1 wt % or less). The light transmittance of the pellets (10% limonene solution, measurement cell thickness, 1 cm; wavelength, 500 nm) was improved from 82% to 87%. By adding activated charcoal 9 manufactured by NORRIT CO. LTD. under the trade name of DARCO or that manufactured by TOKEMI CO. LTD. under the trade name of TA-30 and processing at 60° C. for one hour, colorant components could be reduced further to improve light transmittance to 90% or higher.

The heat resistance of the regenerated pellets, as determined in comparison with the glass transition temperature Tg, could be improved from 100° C. to 105° C., such that it was confined that high quality regenerated styrene could be recycled by sludge removal.

Experimental Example 11

As the organic solvent for dissolving styrene, aromatic solvents, such as toluene, ketone based solvents, such as methylethylketone, etheric solvents, such as tetrahydrofuran, or terpene-based solvents, such as pinene or dipentene, or blends thereof, can be used. Similar experiments were conducted in which 0.5 wt % of the water-absorbing resin (trade name: ST-100) were added to solutions of toluene, methylethylketone, tetrahydrofuran and pinene. The dehydrating and sludge removing effect similar to those of the Experimental Example 8 were confirmed, while the effect of removing impurities similar to that by the device of the Experimental Example 7 could be achieved by carrying out the electrostatic processing by the device of the Experimental Example 7.

Experimental Example 12

30 wt % of the same expanded styrene waste material as that used in the Experimental Example 1 was dissolved in d-limonene. In the solution were contained 1.6 wt % of the moisture and 3 wt % of the sludge component. This solution was heated to 60° C. and added to with 0.2 to 5 wt % of an inorganic dehydrating flocculant (manufactured by MITSUI RIKA CO. LTD. under the trade name of COLGERITE) containing powders of an inorganic flocculant containing an inorganic oxide (57 wt % of silicon oxide, 10 wt % of aluminum oxide and 15 wt % of potassium sulfate) capable of hydrating reaction with 8.5 wt % of calcium oxide. The resulting mixture was stirred for one hour and allowed to stand stationarily for three hours. The sludge dispersed in the solution was precipitated along with the inorganic flocculant, with the supernatant becoming substantially transparent, thus indicating that the sludge not less than 20 $\mu$m could be removed. It was confirmed that the dispersed particles could be decreased in volume from the value of $7.1 \times 10^6$ $\mu m^3$ for the non-processed solution to the value of $5 \times 10^5$ $\mu m^3$ for the processed solution, that is by $\frac{1}{10}$. On the other hand, the water content of the supernatant could be reduced to one-third or less by adding the inorganic dehydrating flocculant to the limonene solution in an amount of 2 wt %. Thus, it was confirmed that the water content and the sludge can be effectively reduced by adding the inorganic flocculant to the limonene solution. Similar effect of removing impurities could be confirmed by carrying out the electrostatic processing using the device of the experimental example 8.

Experimental Example 13

FIG. 10 shows schematics of a device for removing impurities by the combination of a specified dehydrating agent with a electrostatic separation method. The device for removing impurities shown in FIG. 10 is divided into a dehydrating portion (number of dehydrating vessels, four) and an electrostatic portion (number of electrostatic separation vessels, four) and permits processing of approximately 600 liters per hour. The number of the vessels is adjusted depending on the processing volume.

The dehydrating portion is made up of a cylindrically-shaped vessel, lined with a metal mesh, with a diameter of 15 cm and a length of 50 cm, and 500 g of a 50—50% blend of an water-absorbing resin (trade name; ST-100) and cellulose based water-absorbing fibers, charged into the cylindrically-shaped vessel.

The electrostatic portion is a pressure resistant vessel (capacity: 50 liters) charged with a dust collector (manufactured by CLEANTEC KOGYO CO. LTD.) shown in FIG. 9. The electrode material is Teflon. 3.3 kV/cm dc voltage was applied to the electrostatic separation unit through which a solution heated to 60° C. was caused to flow by a gear pump at a flow rate of 10 liters per minute (convection time, 20 minutes).

The water content in the solution passed through the dehydrating portion was decreased from 1.6 wt % to 0.2 wt % to permit electrostatic separation processing at a rate of approximately 600 liters per hour without sparking, thus confirming the effect of removing impurities similar to those of Example 2. By setting the moisture content to not more than 0.2 wt %, the solution of approximately 5000 liters could be processed without sparking, thus confirming the usefulness of the device for separating impurities.

Experimental Example 14

High-impact polystyrene, colored in carbon black, used in e.g., a TV cabinet, was dissolved to a concentration of 20 wt % in d-limonene and added to with inorganic dehydrating flocculant as the solution was heated to 60°.

By processing with the inorganic flocculant (trade name: COLGERITE), the carbon black, a colorant dispersed in the supernatant liquid, was flocculated and precipitated in about one hour, so that light transmittance of the supernatant portion of the solution (1 cm cell, wavelength: 500 nm) was improved from 10% to 60%. This solution, processed with electrostatic separation in the same way as in Experimental Example 7, was further freed of fine pigments contained in the solution, so that the light transmittance of the solution was improved from 60% to 80%. Thus, it was confirmed that the flocculant is effective in clarifying the solution containing the colorant such as a TV cabinet.

A third embodiment of the present invention will now be explained by referring to the drawings. In the present embodiment, the portions or components common to those of the first and second embodiments are depicted by the same reference numerals and are not explained specifically.

Figure 11:
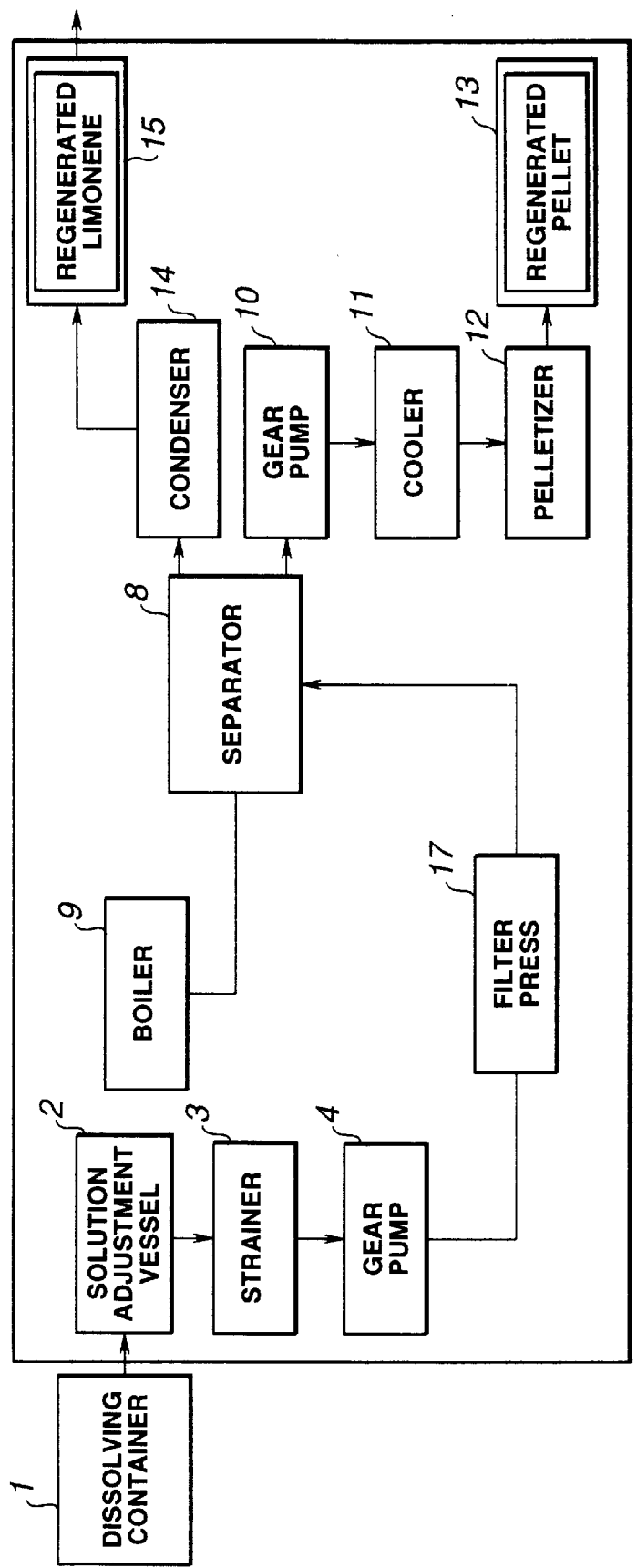
FIG. 11 is a schematic view illustrating a typical processing flow in a recycling system according to a third embodiment of the present invention.
Figure 12:
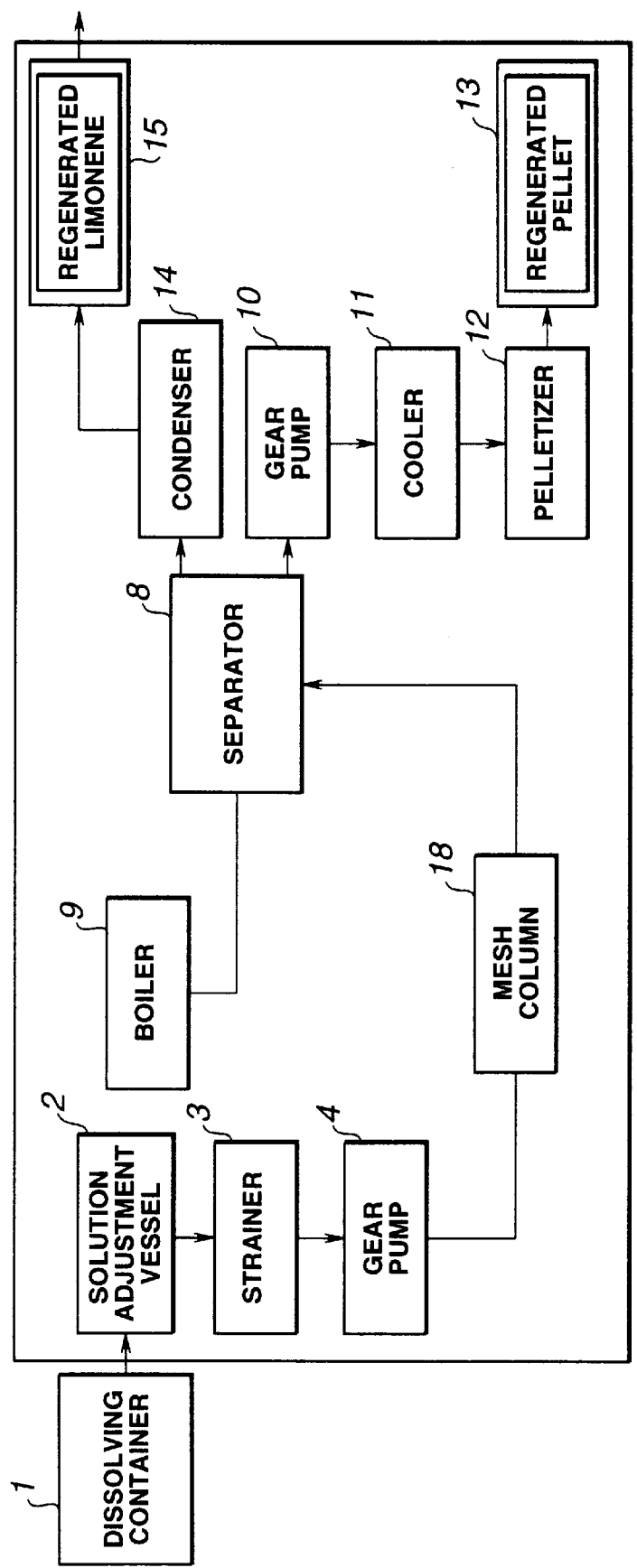
FIG. 12 is a schematic view illustrating another typical processing flow in a recycling system according to a third embodiment of the present invention.

FIG. 11 is a diagram illustrating the process of adding an adsorbent to a styrene solution for contacting the adsorbent with the styrene solution. FIG. 12 is a process diagram when the styrene solution is passed through a column charged with the adsorbent.

In FIG. 11, an adsorbent is added to the solution reduced in volume by dissolving polystyrene in an organic solvent.

For this adsorbent, acid clay, for example, is used, and is added in a solution adjustment vessel 2 to the solution which is stirred while being heated at e.g., 60° C. As the adsorbent, silica-alumina adsorbents, such as acid clay, activated clay or montmorillonite, are preferred. In particular, the basic montmorillonite based clay adsorbent is most desirable.

This solution of high viscosity is fed by the gear pump 4 and freed of acid clay adsorbent by a filter press 17.

The solution is processed in the same way as in the first and second embodiments by being passed through the separator 8 for separation into an organic solvent and polystyrene for regeneration respectively.

FIG. 12 differs from FIG. 11 as to the process of passing the polystyrene solution through a metal mesh column 18 of metal mesh charged with an adsorbent, such as acid clay, following agitation with a solution adjustment vessel 2. By the above process, the solution 3 of the styrene waste material 1 is decolored and can be recycled as regenerated styrene pellets 15, while the organic solvent is recycled as regenerated solvent.

Several Experimental Examples and a Comparative Example of the recycling method for the styrene waste material are hereinafter explained.

In the following Examples 15 to 20 and the Comparative Example 2, expanded styrene fish boxes used up in supermarkets was used as the styrene waste material, while d-limonene with a purity of approximately 95% (manufactured by YASUHARA CHEMICALS CO. LTD.) was used as a organic solvent 2 for dissolving the expanded styrene.

Experimental Example 15

The above-mentioned styrene waste material was dissolved in an amount of 26 wt % in the organic solvent 2. The solution is colored in pale green, with the colorant component being phtalocyanine based and other components. The solution contained 1.6 et % of the moisture and 2 wt % of a sludge component. This solution was heated to 60° C. in the solution adjustment vessel 2. as the adsorbent, 10 wt % of clays A to E were added to the solution which was then stirred for one hour. The adsorbents used were as follows:

clay A: activated clay manufactured by WAKO PURE CHEMICALS CO. LTD.

clay B: activated clay manufactured by WAKO PURE CHEMICALS CO. LTD.

clay C: activated clay (GALEON EARTH V2) manufactured by MIZUSAWA KAGAKU CO. LTD.

clay D: acid clay manufactured by MIZUSAWA KAGAKU CO. LTD. (#400)

clay E: acid clay (#300) manufactured by MIZUSAWA KAGAKU CO. LTD.

The solution processed as described above is centrifuged at 10,000 rpm for ten minutes to precipitate an inorganic substance. The supernatant liquid is diluted by a factor of 10 and measurement was made of the light transmittance. The results are shown in Table 2.

TABLE 2

| samples | pH | light transmittance (%) | | |
| --- | --- | --- | --- | --- |
| | | 400 nm | 500 nm | 700 nm |
| clay A | 3.6 | 85 | 97 | 98 |
| clay B | 4.6 | 87 | 95 | 97 |
| clay C | 3.3 | 85 | 96 | 98 |
| clay D | 4.9 | 70 | 94 | 97 |
| clay E | 9.2 | 91 | 96 | 97 |
| fish box solution | — | 75 | 86 | 92 |

As may be seen from the above Table 2, the decoloring effect was observed by addition. In particular, the clay E (pH=9.2) exhibited high decoloring effects, that is, the solution was decolored and became more transparent, such that the majority of the water and sludge could be removed (moisture and sludge: 0.2%).

Figure 13:
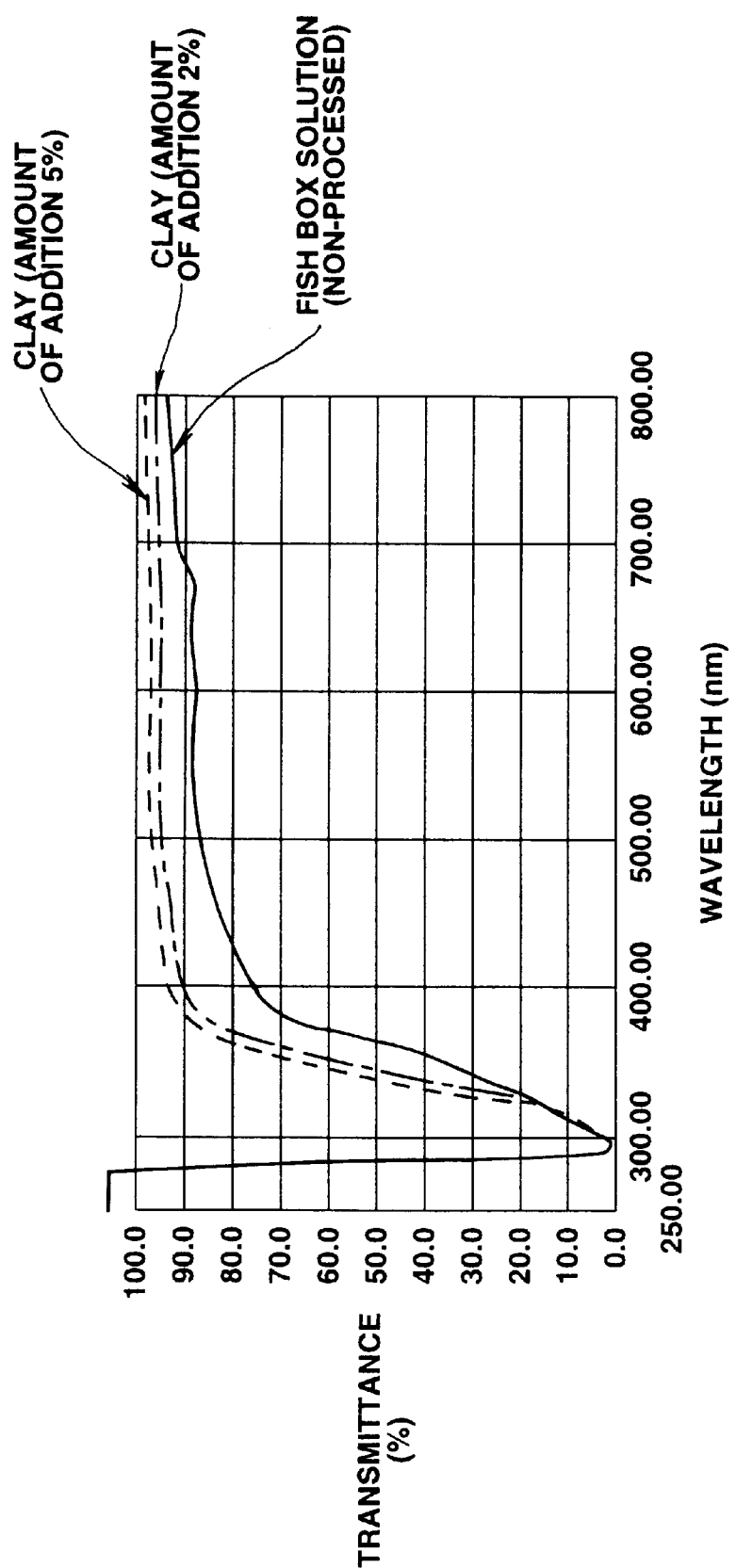
FIG. 13 is a graph showing transmittance characteristics of a solution of the styrene waste material.

FIG. 13 shows the relation between the amount of addition of the processed solution and the light transmittance. If the clay is added in an amount of 0.1%, the meritorious effect was displayed, however, it is not efficient because the solution needs to bestirred for three hours. If the clay is added in an amount exceeding 2%, the desirable effect was displayed by agitation for one hour. If the clay is added in amounts from not less than 5% to not higher than 10%, difference in light transmittance was scarcely observed. Thus, the most efficient amount of addition ranges from not less than 2% to not higher than 5%.

Figure 14:
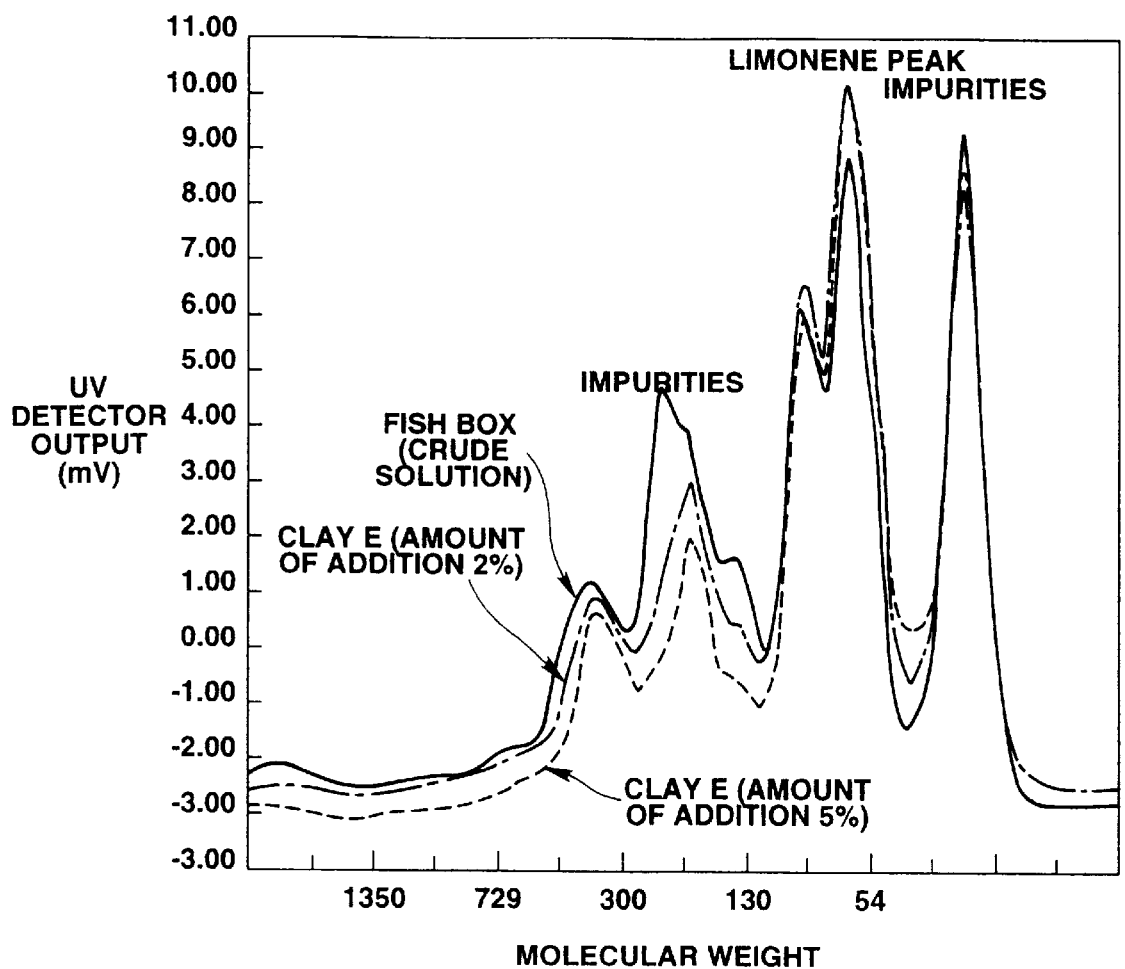
FIG. 14 is a graph showing molecular weight distribution characteristics of a processing solution of the styrene waste material.

FIG. 14 shows the molecular weight distribution of the processed solutions. For measurement, the gel permeation chromatography (GPC) method was used (detection wavelength, 254 nm). By processing with the clay E, the effect of removing impurity components containing colorant components, with the molecular weight being 1500 or less, was ascertained. With the amount of addition of 5%, 49% of the impurities could be removed.

Experimental Example 16

Figure 15:
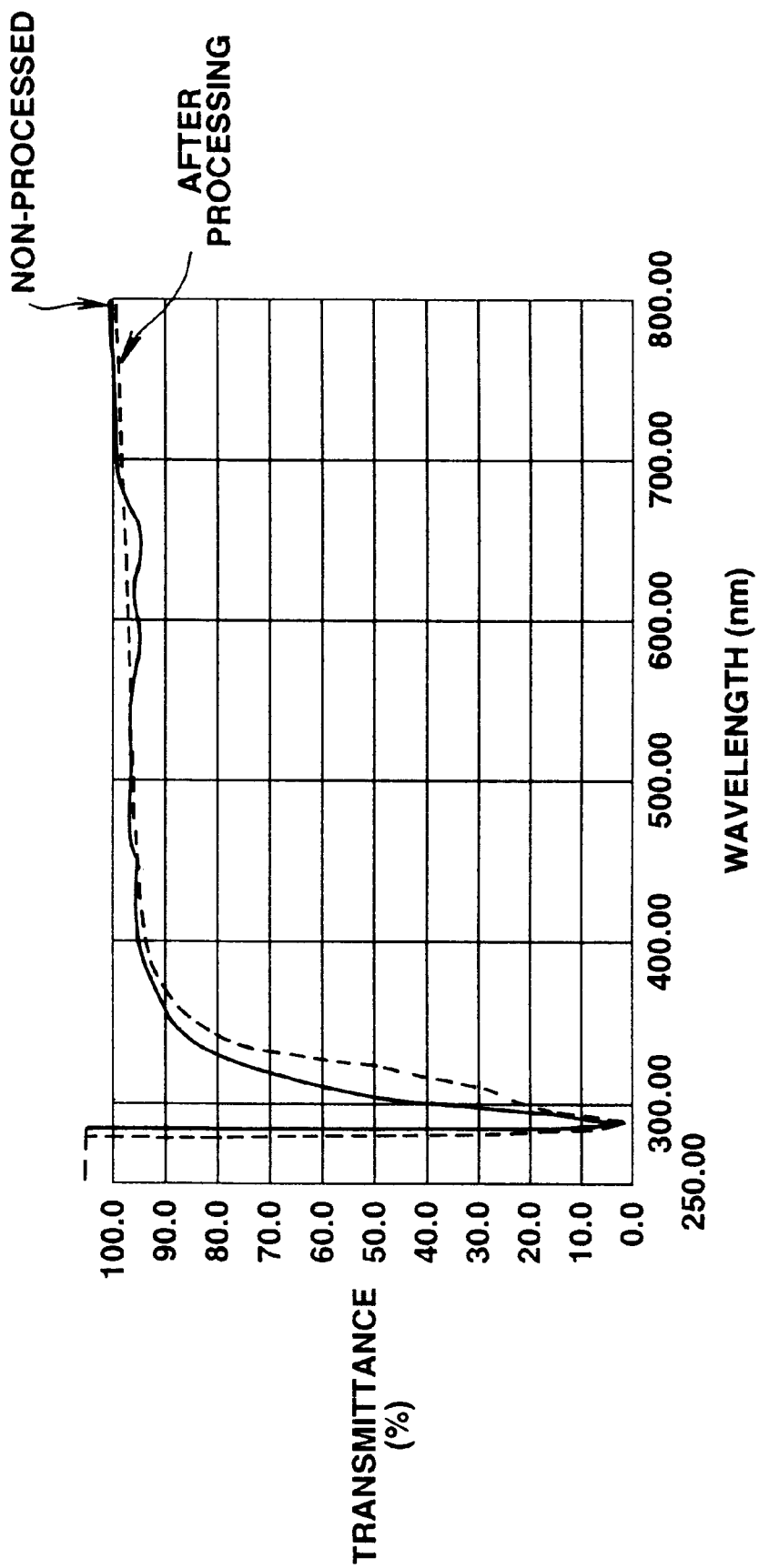
FIG. 15 is a graph showing transmittance characteristics of a solution of the styrene waste material in the third embodiment of the present invention.

FIG. 15 shows the effect of processing with the clay E on the light transmittance of a polystyrene solution colored in blue (colorant: phthalocyanine blue etc). The decoloring effect could be ascertained with the amount of addition of 2%, one hour and heating to 60° C. With the solutions colored in yellow (azo base dye) or in red (anthraquinone based dye), decoloring effects could be ascertained for the same processing conditions. Thus, the clay exhibits meritorious effects in decoloring styrene colorants at large.

Experimental Example 17

If the styrene waste material is not dissolved with the d-limonene solvent alone, used as the organic solvent, the decoloring effect brought about by the addition of the clays A to E as the adsorbent could be confined. The meritorious effect achieved was particularly significant with the use of the clay E.

Experimental Example 18

Instead of adding the adsorbent to the solution of the styrene waste material, 25 kg of the clay E (bulk density: 0.92) were charged, as adsorbent, in a mesh-like column 18 of stainless steel material, with an inner capacity of 30 liters, for processing 300 liters of a solution 3 heated to 60° C. at a flow rate of 3 liters per minute. Decoloring effects comparable to those of the Experimental Example 15 were achieved with a single pass.

Experimental Example 19

As the organic solvent for dissolving styrene, aromatic solvents, such as toluene, ketone based solvents, such as methylethylketone, etheric solvents, such as tetrahydrofuran, or terpene-based solvents, such as pinene or dipentene, or blends thereof, can be used. Similar experiments were conducted in which 2% of the clay E as an adsorbent to polystyrene solutions in toluene, methylethylketone, tetrahydrofuran and pinene. Decoloring and sludge removing effects similar to those obtained in the Experimental Example 15 were confirmed.

Experimental Example 20

A solution of styrene waste material processed with the method of the Experimental Example 15 (concentration: 30%) was processed, in order to remove 95% of inorganic substances by a filter press 17, under the following conditions:

solution temperature: 40° C.

filtering area: 12 m$^2$ air permeability of a polypropylene filter cloth: 500 cc/min assistant agent for filtering: diatomaceous earth (trade name: CELLITE 560).

For further clarification, processing by the electrostatic separation unit used in the second embodiment (strength of the electrical field>3 kV/cm) is effective, since not less than 90% of the inorganic oxides can thereby be removed.

The solution clarified by the above decoloring process was passed through a polyester bag filter 25 μm in size and degasified in a recycling plant having a vacuum heating separating unit 8 under the conditions of:

vacuum heating degasifying unit: HI-VISCOUS EVAPORATOR manufactured by MITSUI ZOSEN CO. LTD.

heating medium temperature: 250° C.

temperature in the evaporating unit: 240° C.

degree of vacuum: 3300 Pa to produce regenerated styrene pellets. In this manner, the regenerated styrene pellets were markedly improved in transparency in comparison with the case of using non-processed solution. Specifically, the light transmittance of the solution containing the regenerated styrene pellets dissolved therein (10% limonene solution; measuring cell thickness, 1 cm; wavelength, 500 nm) was improved from 70% to 95%.

Comparative Example 2

26 wt % of a styrene waste material of expanded styrene was dissolved in an organic solvent of d-limonene. The solution was tinted in pale green ad contained 1.6 wt % of the moisture and 3 wt % of the sludge. This solution was heated to 60° C., added to with 10 wt % of activated charcoal and agitated with a stirrer for one hour. This processing solution 3 was centrifuged for ten minutes at 10000 rpm to precipitate activated charcoal. The supernatant liquid was diluted by a factor of 10 and light transmittance thereof was measured. The results are shown in Table 3.

TABLE 3

| samples | light transmittance (%) | | |
| --- | --- | --- | --- |
| | 400 nm | 500 nm | 700 nm |
| activated charcoal (coal-based) | 70 | 76 | 78 |
| activated charcoal (coconut shell based) | 69 | 76 | 78 |
| activated charcoal (ligneous) | 60 | 68 | 78 |
| solution (non-processed) | 75 | 86 | 92 |

Although the decoloring effect of the solution was observed, activated charcoal was left in the solution. Moreover, there was no moisture removing effect nor sludge removing effect. Thus, it was found that there was no effect in improving light transmittance of the solution.

In the present third embodiment, described above, the adsorbent used is preferably montmorillonite based clay adsorbent exhibiting surface basicity.

For decoloration, the solution is preferably heated to not lower than 40° and to not higher than 100° C., with the adsorbent being not lower than 0.1 wt % and not higher than 10 wt % based on the weight of the solution.

Also, the decoloring agent for the styrene resin of the third embodiment is preferably constituted mainly by a silica alumina adsorbent in turn mainly constituted by montmorillonite based clay adsorbent exhibiting surface basicity.

The acidity and basicity are defined as follows: An inorganic oxide is added to ion exchange water (electrical resistance≧1015 Ω) to prepare a water slurry with a concentration of 5% and, as the water slurry was agitated, the pH value of the aqueous solution is measured. The inorganic powders with the pH value not less than 7 is termed basic powders, while those with the pH value less than 7 are termed acidic powders.

Turning to the montmorillonite based clay, this clay is represented by the chemical formula of $Al_2O_3.4SiO_2.nH_2O$) and has a crystalline structure of three layers, namely a silica layer, an alumina layer and a silica layer. If the montmorillonite based clay is processed with sulfuric acid to dissolve part of alumina, iron or magnesium to yield a compound with a large specific surface, the compound is termed an activated clay used for decoloring oils and fats or processing waste liquid dye. Therefore, the acidic activated charcoal with the pH value not less than 2 and not higher than 4 is routinely used.

What is claimed is:

1. A method for recycling a styrene resin comprising:

removing insoluble components in a solution resulting from dissolution of a styrene resin in an organic solvent by removing said organic solvent from the solution freed of the insoluble components; and recycling the resulting mass as a regenerated styrene resin.

2. The styrene resin recycling method according to claim 1 wherein said organic solvent contains at least one selected from the group consisting of an aromatic organic solvent, a ketone-based organic solvent an a monoterpene-based organic solvent.

3. The styrene resin recycling method according to claim 1 wherein said organic solvent contains not less than 95 vol. % of d-limonene.

4. The styrene resin recycling method according to claim 1 wherein said styrene resin is expanded styrene.

5. A recycling method for a styrene resin comprising:
processing a solution obtained on dissolving a styrene resin in an organic solvent with a dehydrating agent;
removing insoluble components by
heating and degasifying said solution freed of the insoluble components in vacuum to remove the organic solvent; and
recycling the resulting mass as a regenerated styrene resin.

6. The styrene resin recycling method according to claim 5 wherein said dehydrating agent is a water-absorbing resin.

7. The styrene resin recycling method according to claim 6 wherein said water-absorbing resin is at least one of the cross-linked polyacrylate and a starch/acrylic acid graft copolymer cross-linked product.

8. The styrene resin recycling method according to claim 6 further comprising:
adding 0.01 to 3 wt % of said water-absorbing resin to said solution heated to 40° C. or higher to remove the insoluble components.

9. The styrene resin recycling method according to claim 5 wherein said dehydrating agent is a powder mixture containing calcium oxide and an inorganic oxide capable of performing a hydrating reaction with calcium oxide.

10. The styrene resin recycling method according to claim 5 wherein said dehydrating agent contains not less than 90 wt % of a powder mixture containing 5 to 30 wt % of calcium oxide, with the balance being silicon oxide, aluminum oxide and sulfonates.

11. The styrene resin recycling method according to claim 5 wherein the step of adding the dehydrating agent further comprises:
adding 0.01 to 3 wt % of said dehydrating agent to said solution heated to 30° C. or higher to remove insoluble components.

12. A recycling method for a styrene resin comprising:
applying an electrical field to a solution of a styrene resin in an organic solvent to perform electrical field processing to remove insoluble components;
heating and degasifying the solution freed of the insoluble components in vacuum for removing said organic solvent; and
recycling the resulting mass as a regenerated styrene resin.

13. The styrene resin recycling method according to claim 12 wherein said electrical field processing is carried out by a dust collector including a bent electrically insulating sheet arranged between aluminum electrodes layered in a cylindrical configuration, by applying a dc voltage across aluminum electrodes.

14. The styrene resin recycling method according to claim 12 wherein the moisture in the solution of the styrene resin in the organic solvent is set previously to 1 wt % or less.

* * * * *